Patented Oct. 12, 1943

2,331,614

UNITED STATES PATENT OFFICE 2,331,614

PLASTIC COMPOSITION

Kenneth E. Marple, Oakland, and Franklin A. Bent, Berkeley, Calif., assignors to Shell Development Company, San Francisco, Calif., a corporation of Delaware No Drawing. Application March 31, 1941, Serial No. 386,084

9 Claims. (Cl. 106—176)

This invention relates to novel plastic compositions. More particularly, the invention is concerned with compositions comprising cellulose derivatives plasticized with cyclic ketals from trihydric alcohols and ketones containing 8 or more carbon atoms or carboxylic acid ester or ether derivatives thereof.

Many cellulose derivatives such as cellulose acetate and nitrocellulose which are widely used in coating, molding and similar compositions require that a substance known as a plasticizer be incorporated therewith in order to render the compositions containing the cellulose derivatives sufficiently flexible so that they will not crack or splinter. A large variety of substances have been proposed as suitable for plasticizing cellulose derivatives, but only a comparatively few are in commercial use. In general, in order for a substance to be attractive as a plasticizer for cellulose derivative, it is essential that it be compatible therewith, i. e., form a homogeneous mixture with the cellulose derivative, that it have low volatility at ordinary temperatures and that it be capable of being manufactured at low cost.

It is further desirable that the plasticized compositions have high flexibility and extensibility while retaining good tensile strength.

It is an object of the present invention to provide novel compositions comprising cellulose derivatives plasticized with cyclic ketals from trihydric alcohols and aliphatic ketones containing at least 8 carbon atoms or carboxylic acid esters or ethers thereof. Another object is to provide a method of plasticizing cellulose derivatives whereby the high tensile strength of the cellulose derivatives is not greatly lowered even though the flexibility of the compositions is high. These and other more specific objects will be apparent from the description of the invention given hereinafter.

We have found that compositions with superior properties to those known heretofore are obtained by plasticizing cellulose derivatives with the cyclic ketals and the derivatives thereof. The cyclic ketals employed in plasticizing the cellulose derivatives are reaction products of trihydric alcohols with aliphatic ketones. In order that the compounds will have a satisfactorily low volatility, it is essential that the compounds be prepared from aliphatic ketones which contain 8 or more carbon atoms. The compounds from ketones containing between 8 and 12 carbon atoms constitute a preferable group. Such cyclic ketals contain a free hydroxy group and it has been found desirable, in some cases, to employ compounds in which the hydroxy group has been reacted with a carboxylic acid to form the ester or in which it has been converted to an ether group. These compounds are described and claimed in copending applications, Serial No. 380,508, filed February 25, 1941, which issued February 23, 1943, as Patent No. 2,312,298; Serial No. 381,543, filed March 3, 1941; and Serial No. 385,738, filed March 28, 1941, of one of us.

The cyclic ketals may be compounds obtained by reaction of the ketones with any suitable trihydric alcohol such as, for example, glycerol, alpha methyl glycerol, beta methyl glycerol, alpha isopropyl glycerol, beta secondary butyl glycerol, alpha methyl gamma ethyl glycerol, beta cyclopentyl glycerol, alpha cyclohexyl glycerol, alpha phenyl glycerol, 1,3,5-trihydroxy pentane, 1,2,6-trihydroxy hexane, 1,1,1-trimethylol propane and the like. The ketones from which the cyclic ketals are derived are aliphatic ketones containing at least 8 carbon atoms. By an aliphatic ketone reference is made to straight chain, branched chain and cyclic ketones, all of which are devoid of aromatic radicals. Thus, for example, among suitable ketones are included methyl hexyl ketone, ethyl pentyl ketone, propyl butyl ketone, methyl isohexyl ketone, isopropyl secondary octyl ketone, ditertiary butyl ketone, carone, fenchone, fenchosantanone, and the like. Other more complex ketones containing 8 or more carbon atoms may be used such as may be obtained by ketonization of higher fatty acids, by condensation of ketones or ketones and aldehydes to form higher unsaturated ketones which may be saturated with hydrogen to yield higher complex ketones, and by saturation of appropriate higher phenols followed by dehydrogenation of the carbinol group therein to form higher cyclic aliphatic ketones.

The cyclic ketals from a trihydric alcohol and an aliphatic ketone containing 8 or more carbon atoms possess a free hydroxy group which may be esterified with a carboxylic acid to form the corresponding carboxylic acid esters. The esters may be from a variety of carboxylic acids including, for example, acetic acid, propionic acid, butyric acid, isobutyric acid, crotonic acid, chloracetic acid, oleic acid, linoleic acid, palmitic acid, stearic acid, benzoic acid, naphthenic acids, and the like. If desired, however, ethers of the cyclic ketals may be employed wherein the hydrogen atom of the hydroxy group has been substituted by such groups as, for instance, methyl, ethyl, isopropyl, secondary butyl, amyl, cyclopentyl, cyclohexyl, dodecyl, phenyl, tolyl, and the like.

In the case where the plasticizers are derivatives of glycerol, the compounds may be represented by general formula

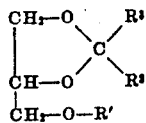

wherein R' represents a hydrogen atom, a hydrocarbon, or the group —CO—R$^4$ in which R$^4$ designates a hydrocarbon radical, and R$^2$ and R$^3$ represent the same or different hydrocarbon radicals, or R$_2$ and R$_3$ represent a single divalent hydrocarbon radical the sum of the number of carbon atoms contained in R$^2$ and R$^3$ being at least 7. These compounds may be classed broadly as substituted 1,3-dioxolanes.

A variety of cellulose derivatives are plasticized by the compounds according to the invention. By the term "cellulose derivatives" reference is made to plastic materials derived from cellulose such as carboxylic esters of cellulose like cellulose acetate, cellulose propionate, cellulose butyrate, cellulose isobutyrate, cellulose acetobutyrate, cellulose propiobutyrate; nitrocellulose; cellulose ethers like ethyl cellulose, methyl cellulose, benzoyl cellulose; and the like. Cellulose acetate is a preferred cellulose derivative in the compositions.

In plasticizing the cellulose derivatives, various methods may be employed to incorporate the plasticizer with the cellulose derivative. The compositions of the invention are homogeneous mixtures of the cellulose derivative and the plasticizer and to obtain such mixtures, it is desirable to intimately mix the plasticizer with the cellulose derivative by some means. For example, the plasticizer may be worked into the cellulose derivative on a heated roll-mill. In this case, the cellulose derivative and the plasticizer may be mixed without the aid of an assisting agent or a small quantity of a comparatively volatile mutual solvent may be used to form a homogeneous mixture, the solvent evaporating during the course of the mixing. Dissolving the cellulose derivative and the plasticizer in a mutual solvent is an especially suitable method of obtaining the compositions for surface coating applications. Upon evaporation of the solvent, the film or residue remains with the plasticizer homogeneously incorporated therein. These and other methods well known in the art may be utilized to incorporate the compounds with the cellulose derivatives.

The properties desired in the finished compositions largely determine the proportion of plasticizer which is incorporated with the cellulose derivative. The larger the proportion of the plasticizer mixed with the cellulose derivative, the more flexible will be the plasticized composition. If the composition is employed in the form of a film and as a surface coating, it may be advantageous to use a larger proportion of plasticizer in the composition than when the compositions are used to prepare molded articles. The proportion of plasticizer used is also dependent upon the particular compound and the particular cellulose derivative used in the plastic composition. In general, the compositions have suitable properties with one part of plasticizer to two parts of cellulose derivatives. In some cases, it may, however, be desirable to use smaller proportions of plasticizer and, in other cases, larger proportions.

The plastic compositions of the invention are very useful material. Many may be used for molding various valuable articles by methods well known in the art. Compositions containing cellulose acetate are particularly suitable for this purpose. The compositions may also be used to impregnate textiles, wood, paper, and the like and to insulate electrical devices, cable and wire. Some of the compositions are suitable for the preparation of filaments, threads and fibers while others may be used to prepare films such as are used in photography, etc. An important application is in coating compositions for use as surface coverings such as lacquers, varnishes, enamels, and the like. Nitrocellulose containing compositions are especially suitable for the last named application. For various special purposes to which the compositions may be put, it may be desirable to incorporate with them other ingredients such as dyes, fillers, pigments, other plasticizers, other plastics and resins, and the like. For preparing coating compositions, various solvents may be used such as alcohols, esters, ketones, hydrocarbons, etc.

The results of tests performed with various compositions comprising cellulose derivatives and the plasticizers are set forth below, but it is to be understood that the invention is not to be construed or limited to the particular compositions given therein.

The compounds employed as plasticizers in the tests follow together with, for convenience, a shortened name for them:

A cyclic ketal from glycerol and an aliphatic ketone containing 8 carbon atoms obtained by hydrating a fraction of cracked wax to obtain a straight chain secondary alcohol which was dehydrogenated to the corresponding ketone. Designated as C$_8$ cyclic ketal.

A cyclic ketal from glycerol and an aliphatic cyclic ketone containing 9 carbon atoms obtained by hydrogenating alkyl phenols containing 9 carbon atoms to the cyclic alcohols and dehydrogenating the carbinol group thereof to form the corresponding cyclic ketones. Designated as C$_9$ cyclic ketal.

A cyclic ketal from glycerol and an aliphatic ketone containing 12 carbon atoms obtained by condensing mesityl oxide and saturating the formed 12 carbon atom unsaturated ketone. Designated as C$_{12}$ cyclic ketal.

The phenyl ether of a cyclic ketal from glyceryl alpha phenyl ether and the same aliphatic ketone containing 8 carbon atoms as used in the C$_8$ cyclic ketal. Designated as phenyl ether of C$_8$ cyclic ketal.

The acetate of a cyclic ketal from glyceryl alpha monoacetin and the same aliphatic ketone containing 8 carbon atoms as used in the C$_8$ cyclic ketal. Designated as acetate of C$_8$ cyclic ketal.

Tests were made of the volatility of the compounds by measuring the loss of weight which occurred with a sample which was maintained at about 70° C. for three days. The loss of weight in percentage was as follows:

| | |
|---|---|
| C$_8$ cyclic ketal | 13.53 |
| C$_9$ cyclic ketal | 4.42 |
| C$_{12}$ cyclic ketal | 6.60 |
| Phenyl ether of C$_8$ cyclic ketal | 2.19 |
| Acetate of C$_8$ cyclic ketal | 11.91 |

The compounds are seen to have low volatility under this somewhat severe test.

The compatibility of the compounds for various cellulose derivatives was tested by dissolving about 2 parts of the cellulose derivative and 1 part of the compound in a mutual solvent, spreading the solution on glass panels, permitting them to dry and observing the appearance of the films. Clear films indicated that the plasticizer was compatible in the proportions chosen. The results follow:

| Compound | Nitrocellulose (½ sec. R. S.) | Cellulose acetate (lacquer grade) | Ethyl cellulose | Cellulose acetobutyrate |
|---|---|---|---|---|
| $C_8$ cyclic ketal | Clear | Clear | Clear | Clear. |
| $C_9$ cyclic ketal | do | do | do | Do. |
| $C_{12}$ cyclic ketal | do | Cloudy [1] | do | Do. |
| Phenyl ether of $C_8$ cyclic ketal | | do | | |
| Acetate of $C_8$ cyclic ketal | | Clear | | |

[1] Clear film with 4 parts cellulose acetate and 1 part $C_{12}$ cyclic ketal

Tests were made of the flexibility of films of cellulose acetate plasticized with some of the compounds on a Scott tensile strength tester Model X-5 and are given as the ultimate tensile strength and ultimate elongation at the breaking point for the films. The films were aged about eight weeks before the test. Tests were also made of the permeability of plasticized cellulose acetate films to water since this is a valuable measure of the ability of the compositions to give protection to surfaces when used as coatings. In these films, the specific permeability is defined as the milligrams of water which will pass through one square centimeter of a film having a thickness of one millimeter in 24 hours when there is a relative humidity differential of 100% between the two sides of the film at a temperature of 90° F. It is seen that the plasticized films have lower specific permeability than unplasticized cellulose acetate which indicates the resistance of the films towards water vapor is improved. The results obtained were as follows:

| Compound | Per cent plasticizer | Ultimate tensile strength ($Kg./mm.^2$) | Ultimate elongation (Per cent) | Specific permeability |
|---|---|---|---|---|
| No plasticizer | 0 | 5.73 | 8 | 4.390 |
| $C_8$ cyclic ketal | 33 | 5.50 | 9 | 3.583 |
| $C_9$ cyclic ketal | 33 | 4.75 | 10 | 2.934 |
| $C_{12}$ cyclic ketal | 33 | 5.84 | 8 | 2.699 |
| Acetate of $C_8$ cyclic ketal | 33 | 4.40 | 7 | 3.057 |

We claim as our invention:

1. A composition which comprises cellulose acetate and a cyclic ketal from glycerol and an aliphatic cyclic monoketone containing not less than 8 nor more than 12 carbon atoms, said cyclic ketal being present in the composition in a proportion compatible with the cellulose acetate.

2. A composition which comprises a carboxylic acid ester of cellulose and a compatible proportion of a cyclic ketal from glycerol and an aliphatic monoketone containing at least 8 carbon atoms.

3. A composition which comprises a carboxylic acid ester of cellulose and a compatible proportion of a plasticizing compound from the group consisting of a cyclic ketal from glycerol and an aliphatic monoketone containing at least 8 carbon atoms, a carboxylic acid ester thereof, and an ether thereof.

4. A composition which comprises ethyl cellulose and a cyclic ketal from glycerol and an aliphatic cyclic monoketone containing not less than 8 nor more than 12 carbon atoms, said cyclic ketal being present in the composition in a proportion compatible with the ethyl cellulose.

5. A composition which comprises a cellulose ether and a compatible proportion of a plasticizing compound from the group consisting of a cyclic ketal from glycerol and an aliphatic monoketone containing at least 8 carbon atoms, a carboxylic acid ester thereof, and an ether thereof.

6. A composition which comprises nitrocellulose and a cyclic ketal from glycerol and an aliphatic cyclic monoketone containing not less than 8 nor more than 12 carbon atoms, said cyclic ketal being present in the composition in a proportion compatible with the nitrocellulose.

7. A composition which comprises nitrocellulose and a compatible proportion of a plasticizing compound from the group consisting of a cyclic ketal from glycerol and an aliphatic monoketone containing at least 8 carbon atoms, a carboxylic acid ester thereof, and an ether thereof.

8. A composition comprising a cellulose derivative from the group consisting of cellulose esters and cellulose ethers and a plasticizing compound from the group consisting of a cyclic ketal from a trihydric alcohol and an aliphatic monoketone containing at least 8 carbon atoms, a carboxylic acid ester thereof, and an ether thereof, said compound being present in the composition in an amount compatible with said cellulose derivative.

9. A plasticized composition comprising a cellulose derivative from the group consisting of cellulose esters and cellulose ethers and a compound from the group consisting of a cyclic ketal from a trihydric alcohol and an aliphatic monoketone containing at least 8 carbon atoms, a carboxylic acid ester thereof, and an ether thereof.

KENNETH E. MARPLE.
FRANKLIN A. BENT.